United States Patent [19]

Hans et al.

[11] Patent Number: 4,607,737
[45] Date of Patent: Aug. 26, 1986

[54] HYDRAULICALLY OPERATING RELEASE ARRANGEMENT, ESPECIALLY FOR A VEHICLE CLUTCH

[75] Inventors: Rüdiger Hans, Niederwerrn; Werner Kotzab, Schweinfurt, both of Fed. Rep. of Germany

[73] Assignee: SKF Kugellagerfabriken GmbH, Schweinfurt, Fed. Rep. of Germany

[21] Appl. No.: 518,076

[22] Filed: Jul. 28, 1983

[30] Foreign Application Priority Data

Jul. 28, 1982 [DE] Fed. Rep. of Germany ... 8221436[U]

[51] Int. Cl.$^4$ ............................................. F16D 25/08
[52] U.S. Cl. .............................. 192/88 A; 192/91 A; 192/98; 92/98 D; 92/101
[58] Field of Search ............. 192/88 A, 85 CA, 91 A, 192/98; 92/92, 94, 98 D, 101, 128; 188/366, 367; 267/158, 160, 164, 181

[56] References Cited

U.S. PATENT DOCUMENTS

| 2,574,700 | 11/1951 | Knauss | 92/94 |
| 2,594,665 | 4/1952 | Lockwood | 267/160 |
| 3,140,113 | 7/1964 | Williams | 267/160 |
| 3,224,345 | 12/1965 | Doetsch | 92/94 |
| 4,394,832 | 7/1983 | Weiler et al. | 92/98 |
| 4,491,211 | 1/1985 | Steeg | 267/181 |
| 4,524,855 | 6/1985 | Brandenstein | 192/88 A |

FOREIGN PATENT DOCUMENTS 696208 11/1979 U.S.S.R. ............................ 267/160

Primary Examiner—Samuel Scott
Assistant Examiner—Noah Kamen
Attorney, Agent, or Firm—Yuter, Rosen & Dainow

[57] ABSTRACT

A hydraulically operating clutch release includes a housing having a pressure chamber sealed by a roll membrane. A clutch bearing is axially displaceable in the housing. A support body abuts the roll membrane in the chamber, and resiliently engages the bottom surface of the pressure chamber in the axial direction, to prevent damage to the roll membrane.

5 Claims, 5 Drawing Figures

HYDRAULICALLY OPERATING RELEASE ARRANGEMENT, ESPECIALLY FOR A VEHICLE CLUTCH

FIELD OF THE INVENTION

This invention relates to an hydraulically operating release arrangement, especially for vehicle clutches, comprised of a housing having a pressure chamber sealed by a roll membrane, and a clutch bearing arranged to be axially displaced in the housing.

BACKGROUND OF THE INVENTION

Hydraulically operable release arrangements are disclosed, for example, in DE-OS 2217943. In this known arrangement, cracks can form in the folded regions of the roll membrane, if they collapse under pressure conditions, for example, in the assembly or disassembly of the release arrangement.

In accordance with the disclosure of DE-GM 1952266, folding bellows of an articulated seal are supported by a spring or the like. This arrangement has the disadvantage, however, that the spring lightly rubs on the bellows, thereby minimizing the usefulness of the arrangement as a result of the wear on the bellows.

SUMMARY OF THE INVENTION

The present invention is therefore directed to the provision of an hydraulically clutch arrangement of the known type, in which the cracking and rubbing of the roll membrane is avoided.

The object of the invention is solved by providing an arrangement wherein a support body is provided in the pressure chamber, the support body abutting the roll membrane and being resiliently arranged in the axial direction against the bottom surface of the pressure chamber.

With this construction of the support body, the roll membrane is supported at all operating positions, so that it cannot be damaged, for example, in the assembly and disassembly of the release arrangement.

In accordance with a further feature of the invention the support body may be annular or cup-shaped and provided, for example, with resilient fingers on its axially directed sections. The free ends of the spring fingers are bent around radially inwardly and elastically roll upon changes in the axial dimension of the pressure chamber. The support body can be injection-molded of a plastic material, and is therefore simple and inexpensive to produce.

BRIEF DESCRIPTION OF THE DRAWINGS

In order that the invention will be more clearly understood, it will now be described in greater detail with reference to the accompanying drawings.

DETAILED DESCRIPTION OF THE PREFERRED EMBODIMENTS

Figure 1:
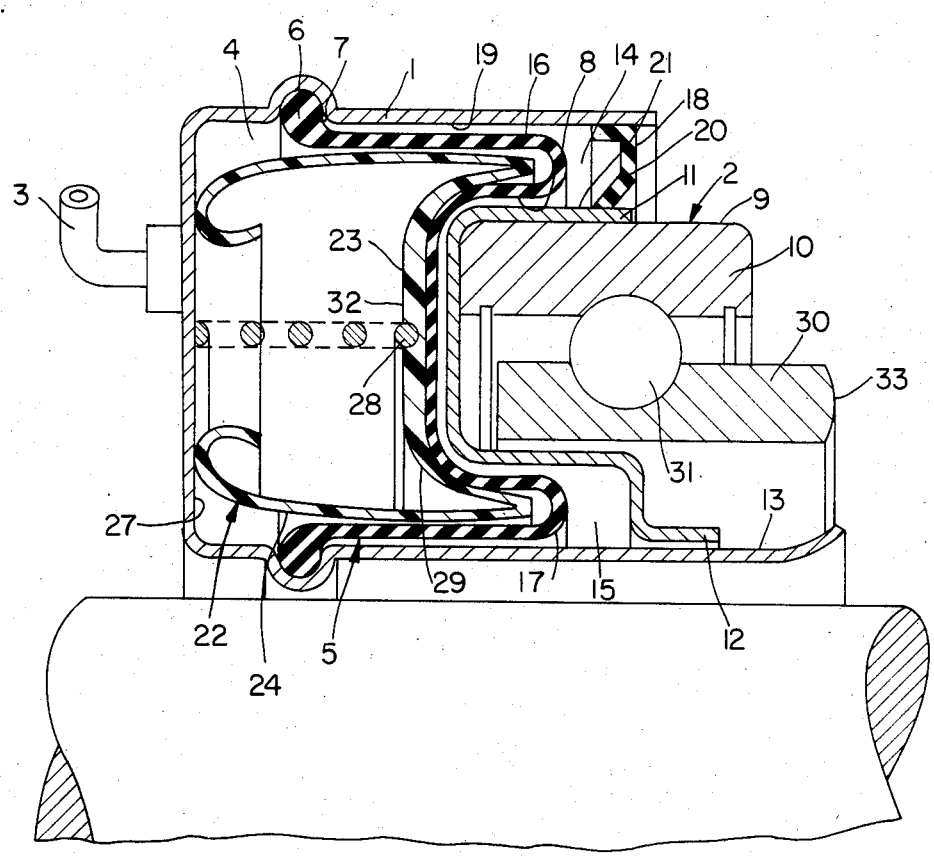
FIG. 1 is a longitudinal section of a hydraulic release arrangement according to the invention, for an annular pressure chamber.
Figure 2:
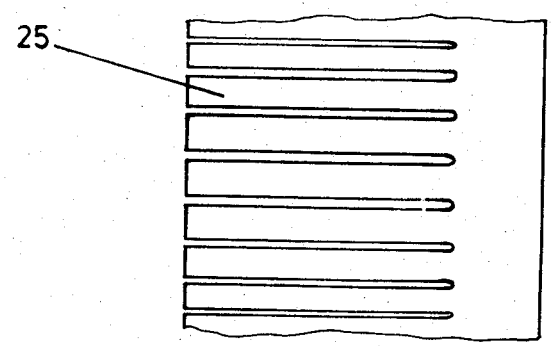
FIG. 2 is a part of a plane view of a support body for the release arrangement according to FIG. 1.
Figure 3:
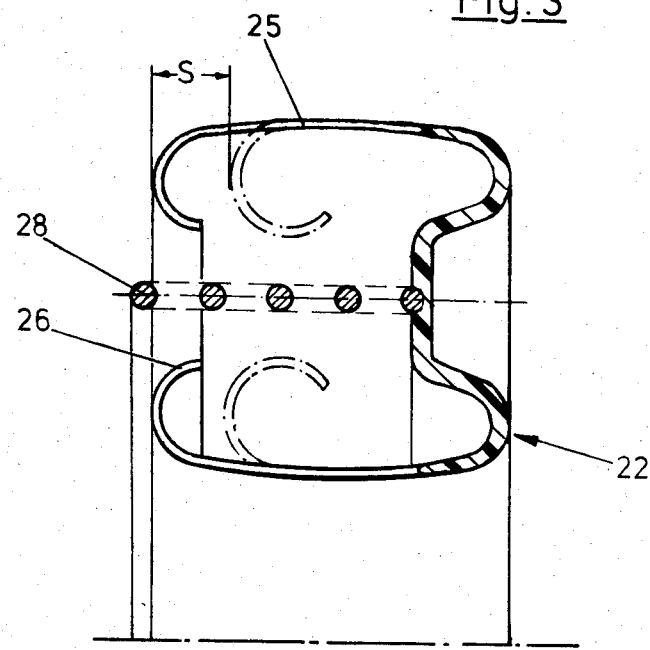
FIG. 3 is a longitudinal section through the release body according to FIG. 2.

Referring now to the drawings, and more in particular to FIG. 1, therein is illustrated a hydraulically operated release arrangement comprised of an annular housing 1 and a clutch bearing 2. The housing 1 is connected to a tube 3 for conducting a pressure medium to and from the pressure medium-filled chamber 4. The chamber 4 is outwardly closed by a roll membrane 5 made of reinforced rubber or a similar material. The roll membrane has a curved reinforcement 6 at its rim which engages an annular groove 7 in the inner wall of the housing 1, for holding the roll membrane in the housing 1. The roll membrane 5 has an annular recess 8 for receiving the clutch bearing 2. A cup-shaped sheet metal part 11 is provided on the outer surface of the nonrotating bearing ring 10, the sheet metal part 11 guiding the clutch bearing 2 on the outer surface 13 with an axially extending surface 12. Annular spaces 14, 15 are provided between the clutch bearing 2 and the housing 1, and between the sheet metal part 11 and the housing 1, respectively. The sections 16, 17 of the roll membrane 5 extend into the annular spaces 14, 15, respectively. The outer annular space 14 is closed by a sealing ring 18 inserted in the housing bore 19, the sealing ring having a radially inner lip 20 slidably engaging the outer surface 21 of the sheet metal part 11. An annular support body 22 is arranged in the pressure chamber 4, the support body 22 engaging the inner surface 23 of the roll membrane 5 and supporting in its entire operating movement. The annular support body 22 has an M-shaped cross section, with the arms 24 thereof extending in the axial direction. As is also apparent in FIGS. 2 and 3, the arms 24 are provided with spring fingers 25 bent inwardly, with respect to the cross section, at their ends 26. During the work movement S, the spring fingers 26 roll inwardly, as illustrated by dash-dot lines in FIG. 3, and are pressed against the bottom surface 27 of the pressure chamber 4, so that the roll membrane 5 is fully supported during the engagement and release of the clutch (not shown), and collapsing and cramping of the roll membrane with under-or-over-pressure is assurably due to the force applied by bottom surface 32 and the blocking presence of arms 24. A pressure spring 28 is provided in the pressure chamber 4, with one end thereof preferably being molded in the bottom 29 of the plastic support body 22. This spring 28 is supported against the bottom 27 of the pressure chamber and biases the rotating bearing ring 30 of the clutch bearing 2 against the clutch spring (not shown) of the clutch, so that the balls 31 of the clutch bearing 2 are constantly held in contact with the races of the rotating bearing ring 30 and the nonrotating bearing ring 10.

In order to release the clutch, a pressure is produced in the chamber 4. This pressure acts on the nonrotating bearing ring 10 by way of the bottom surface 32 of the support body 22 and the roll membrane 5. The release force is then transmitted to the inner ring 30 of the clutch bearing 2 by way of the balls 31, the end surface 33 of the inner ring 30 then pressing against the plate spring (not shown) of the clutch, which pushes the plate spring to the right and releases the clutch.

Figure 4:
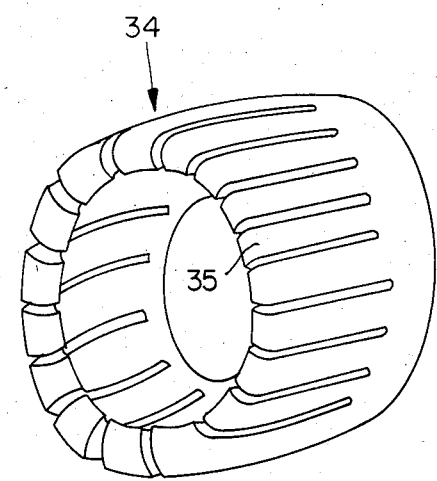
FIG. 4 is a perspective view of a cup-shaped support body for a release arrangement having a cylindrical pressure chamber.

FIG. 4 illustrates a cup-shaped support body 34 which is used in the hydraulic release arrangement, in which the pressure spaced closed by a roll membrane is not an annular chamber, but is in the form of a cylindrical chamber. The support body 34 is provided with resilient fingers 35 which function in the same manner as the resilient fingers 25 of the support body of the arrangement of the invention illustrated in FIGS. 1–3.

Figure 5:
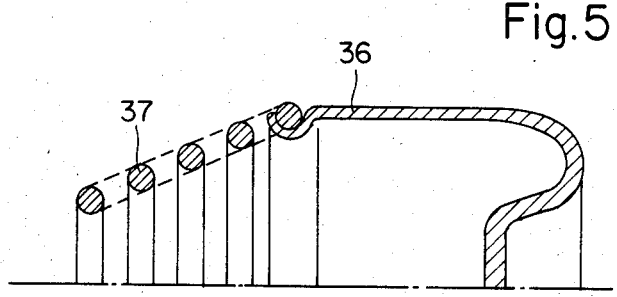
FIG. 5 is a partial cross-sectional view of a release body with a separator spring.

The support body 36 illustrated in FIG. 5, instead of having spring fingers, is provided on the side thereof away from the clutch with a separate coil spring 37 which is supported on the bottom surface of the pressure chamber.

The above-discussed arrangements constitute only a few examples of the hydraulic release arrangement in accordance with the invention. Modifications in the construction of the individual components are hence within the scope of the invention. For example, the support body may be fabricated of one or more parts, of plastic materials and/or metal. In addition, the support body may be arranged either inside or outside of the roll membrane.

What is claimed is:

1. In an hydraulically operating release arrangement comprised of a housing having a pressure chamber sealed by a roll membrane having an inner surface facing inwardly of said chamber and defining an axis, a biasing means for applying an axial biasing force to said membrane, and a clutch bearing arranged to be axially displaceable in the housing; the improvement wherein a support body is provided in the pressure chamber, the support body abutting said inner surface of the roll membrane with said biasing force applied by said biasing means and said body including means for resiliently engaging a bottom surface of the pressure chamber facing said and inner surface in the axial direction.

2. The hydraulically operating release arrangement of claim 1, wherein said support body is annular and has an M-shaped cross-section, said resilient means having a plurality of resilient fingers extending axially in the direction of and engaging the bottom surface of the pressure chamber, each of said fingers being bent around at a free end.

3. The hydraulically operating release arrangement of claim 1, wherein the support body is cup-shaped and said resilient means comprises a plurality of resilient fingers, each of said fingers being bent around at a free end and engaging the bottom surface of the pressure chamber.

4. The hydraulically operating release arrangement of claim 1 wherein said biasing means is a pressure spring is arranged between a bottom surface of the support body and the bottom surface of the pressure chamber.

5. In an hydraulically operating release arrangement comprising an annular housing having a pressure chamber, a roll membrane defining an axis and having an inner surface facing inwardly of said chamber and arranged to seal said pressure chamber, biasing means for applying an axial biasing force to said membrane, and a clutch bearing arranged to be axially displaceable in said housing, the improvement wherein a support body having a bottom surface and two substantially axially extending means are arranged in said pressure chamber such that said bottom surface abuts said inner surface of said roll membrane with said axial biasing force applied by said biasing means and an end of each of said axially extending means resiliently engages a bottom surface of said pressure chamber which faces said inner surface, said axially extending means being further arranged to block the collapse of a folded portion of said roll membrane.

* * * * *

UNITED STATES PATENT AND TRADEMARK OFFICE
CERTIFICATE OF CORRECTION

PATENT NO. : 4,607,737
DATED : August 26, 1986
INVENTOR(S) : Rudiger Hans, et al It is certified that error appears in the above-identified patent and that said Letters Patent is hereby corrected as shown below:

Column 2, line 49, after "bottom" insert -- surface --.

Column 2, line 66, delete "spaced" and insert -- space --.

Column 3, line 31, delete "and".

Signed and Sealed this

Twenty-eighth Day of April, 1987

Attest:

DONALD J. QUIGG

Attesting Officer

Commissioner of Patents and Trademarks